US008665964B2

(12) United States Patent
Joshi et al.

(10) Patent No.: US 8,665,964 B2
(45) Date of Patent: Mar. 4, 2014

(54) VIDEO CODING BASED ON FIRST ORDER PREDICTION AND PRE-DEFINED SECOND ORDER PREDICTION MODE

(75) Inventors: Rajan L. Joshi, San Diego, CA (US); Peisong Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1282 days.

(21) Appl. No.: 12/495,613

(22) Filed: Jun. 30, 2009

(65) Prior Publication Data

US 2010/0329342 A1 Dec. 30, 2010

(51) Int. Cl.
*H04N 7/18* (2006.01)

(52) U.S. Cl.
USPC .............................. 375/240.25; 375/240.11

(58) Field of Classification Search
USPC ..................................... 375/240.01–240.29
See application file for complete search history.

(56) References Cited

U.S. PATENT DOCUMENTS

2006/0256867 A1* 11/2006 Turaga et al. ............ 375/240.16
2008/0008235 A1    1/2008 Segall
2010/0310184 A1* 12/2010 Yu et al. .................... 382/238

OTHER PUBLICATIONS

"Advanced Video Coding for Generic Audiovisual Services," ITU-T Rec. H.264, Mar. 2005.
S. Chen et al., "Re-Prediction in Inter-Prediction of H.264", ITU0-T Q.6/SG16 VCEG, VCEG-AG20, Oct. 2007.
S. Chen et al., "Second Order Prediction (SOP) in P-Slice", ITU-T Q.6/SG16 VCEG-AI27, Jul. 2008.
S. Li et al., "Additional Results of Second Order Prediction (SOP) in P Slice", ITU-T Q.6/SG16 VCEG, VCEG-AJ27, Oct. 2008.
S. Li et al., "Test Results of Second Order Prediction (SOP)", ITU-T Q.6/SG16, COM16-C 154-E, Jan. 2009.
Chen S et al: "Second order prediction in P slice" 35. VCEG Meeting; 85. MPEG Meeting; Jul. 16, 2008-Jul. 18, 2008; Berlin; (Video Coding Experts Group of ITU-T SG.16),, Jul. 12, 2008, XP030003592 pp. 1-5; figure 3.
International Search Report and Written Opinion—PCT/US2010/040481, International Search Authority—European Patent Office—Sep. 14, 2010.
Xin Jin et al: "Combined Inter-Intra Prediction for High Definition Video Coding (Abstract)" 26. Picture Coding Symp0sium;7-II-2007-Nov. 9, 2007; Lisbon,, Nov. 7, 2007, XP030080387 the whole document.

* cited by examiner

*Primary Examiner* — Andy Rao
(74) *Attorney, Agent, or Firm* — Steven Thiel; Brent Boyd

(57) ABSTRACT

This disclosure describes video encoding and decoding techniques in which a first order prediction process and a second order prediction process are used in combination to generate predictive video blocks for video coding. First order prediction may be similar to conventional motion estimation and motion compensation that generates residual video blocks. The second order prediction may involve a process similar to conventional intra-prediction, but is performed on the residual video blocks. The techniques of this disclosure may pre-define the second order prediction to a specific mode, such as a mode similar to the intra-DC mode used in intra coding. In addition, the techniques of this disclosure may combine aspects of the first order and second order prediction into a single process so that the effects of second order prediction on the residuals are taken into account during the first order prediction process, which may improve compression.

13 Claims, 7 Drawing Sheets

VIDEO CODING BASED ON FIRST ORDER PREDICTION AND PRE-DEFINED SECOND ORDER PREDICTION MODE

TECHNICAL FIELD

The disclosure relates to video coding and, more particularly, video coding that uses prediction techniques.

BACKGROUND

Digital multimedia capabilities can be incorporated into a wide range of devices, including digital televisions, digital direct broadcast systems, wireless communication devices, wireless broadcast systems, personal digital assistants (PDAs), laptop or desktop computers, digital cameras, digital recording devices, video gaming devices, video game consoles, cellular or satellite radio telephones, digital media players, and the like. Digital multimedia devices may implement video coding techniques, such as MPEG-2, ITU-H.263, MPEG-4, or ITU-H.264/MPEG-4 Part 10, Advanced Video Coding (AVC), to transmit and receive or store and retrieve digital video data more efficiently. Video encoding techniques may perform video compression via spatial and temporal prediction to reduce or remove redundancy inherent in video sequences.

In predictive video encoding, data compression can be achieved through spatial prediction, motion estimation and motion compensation. Intra-coding relies on spatial prediction, quantization, and transform coding such as discrete cosine transform (DCT), to reduce or remove spatial redundancy between video blocks within a given video frame. Inter-coding relies on temporal prediction, quantization, and transform coding to reduce or remove temporal redundancy between video blocks of successive video frames of a video sequence. Intra-coded frames ("I-frames") are often used as random access points as well as references for the inter-coding of other frames. I-frames, however, typically exhibit less compression than other frames. The term I-units may refer to I-frames, I-slices or other independently decodable portions of an I-frame.

For inter-coding, a video encoder performs motion estimation to track the movement of matching video blocks between two or more adjacent frames or other coded units, such as slices of frames. Inter-coded frames may include predictive frames ("P-frames"), which may include blocks predicted from a previous frame, and bidirectional predictive frames ("B-frames"), which may include blocks predicted from a previous frame and a subsequent frame of a video sequence. More generally, B-video blocks may be predicted from two lists of data, which may correspond to data from two previous frames, two subsequent frames, or one previous frame and one subsequent frame. In contrast, P-video blocks are predicted based on one list, i.e., one data structure, which may correspond to one predictive frame, e.g., one previous frame or one subsequent frame. B-frames and P-frames may be more generally referred to as P-units and B-units. P-units and B-units may also be realized in smaller coded units, such as slices of frames or portions of frames. B-units may include B-video blocks, P-video blocks or I-video blocks. P-units may include P-video blocks or I-video blocks. I-units may include only I-video blocks.

For P- and B-video blocks, motion estimation generates motion vectors, which indicate the displacement of the video blocks relative to corresponding prediction video blocks in predictive reference frame(s) or other coded units. Motion compensation uses the motion vectors to generate prediction video blocks from the predictive reference frame(s) or other coded units. After motion compensation, a residual video block is formed by subtracting the prediction video block from the original video block to be coded. The video encoder usually applies transform, quantization and entropy coding processes to further reduce the bit rate associated with communication of the residual block. I- and P-units are commonly used to define reference blocks for the inter-coding of P- and B-units.

SUMMARY

This disclosure describes video encoding and decoding techniques in which a first order prediction process and a second order prediction process are used in combination to generate predictive video blocks for video coding. First order prediction may include motion estimation and motion compensation processes. In first order prediction, a video block being coded is compared to reference video blocks to identify a predictive video block, which is then subtracted from the video block being coded in order to generate a residual video block. The second order prediction may involve a process similar to conventional intra-prediction, but is performed on the residual video blocks. The techniques of this disclosure may pre-define the second order prediction to a specific mode, such as a mode similar to the intra-DC mode used in intra coding. In addition, the techniques of this disclosure may combine aspects of the first order and second order prediction into a single process so that the effects of second order prediction on the residuals are taken into account during the first order prediction process, which may improve compression.

In one example, this disclosure describes a method of encoding video data in a video encoder. The comprises performing a first order prediction process via the video encoder to generate at least two first order residual blocks for a given video block being coded, performing a second order prediction process via the video encoder to generate at least one second order residual block for the given video block being coded based on one of the first order residual blocks and a pre-defined mode for the second order prediction process, and performing a rate-distortion analysis via the video encoder with respect to the second order residual block and at least one of the first order residual blocks to substantially minimize a rate-distortion cost associated with encoding the given video block, wherein the rate-distortion analysis with respect to the second order residual block accounts for a combined effect of the first order prediction process and the second order prediction process in coding the given video block.

In another example, this disclosure describes a method of decoding video data in a video decoder. The method comprises receiving one bit per macroblock that defines whether second order prediction was used in an encoding process on the macroblock, performing a first order prediction process via the video decoder to identify a first order predictive block used to code a given video block, and if the one bit indicates that second order prediction was not used, decoding the given video block based on the first order predictive block. If the one bit indicates that second order prediction was used, the method comprises performing a second order prediction process via the video decoder to generate a second order predictive block used to code the given video block, wherein the second order prediction defines a pre-defined prediction mode. If the one bit indicates that second order prediction was used, the method comprises decoding the given video block based on the first order predictive block and the second order predictive block.

In another example, this disclosure describes a video encoding apparatus that encodes video data. The video encoding apparatus comprises a first order coding unit that performs a first order prediction process to generate at least two first order residual blocks for a given video block being coded, a second order coding unit that performs a second order prediction process to generate at least one second order residual block for the given video block being coded based on one or the first order residual blocks and a pre-defined mode for the second order prediction process, and a rate-distortion analysis unit that performs a rate-distortion analysis with respect to the second order residual block and at least one of the first order residual blocks to substantially minimize a rate-distortion cost associated with encoding the given video block, wherein the rate-distortion analysis with respect to the second order residual block accounts for a combined effect of the first order prediction process and the second order prediction process in coding the given video block.

In another example, this disclosure describes a video decoding apparatus that decodes video data. The video decoding apparatus comprises a decoding unit that receives and decodes one bit per macroblock that defines whether second order prediction was used in an encoding process on the macroblock, and a prediction unit that performs a first order prediction process to identify a first order predictive block used to code a given video block. If the one bit indicates that second order prediction was not used, the video decoding apparatus decodes the given video block based on the first order predictive block. If the one bit indicates that second order prediction was used, the prediction unit performs a second order prediction process to generate a second order predictive block used to code the given video block, wherein the second order prediction define a pre-defined prediction mode. If the one bit indicates that second order prediction was used, the video decoding apparatus decodes the given video block based on the first order predictive block and the second order predictive block.

In another example, this disclosure describes a device for encoding video data, the device comprising means for performing a first order prediction process to generate at least two first order residual blocks for a given video block being coded, means for performing a second order prediction process to generate at least one second order residual block for the given video block being coded based on one of the first order residual blocks and a pre-defined mode for the second order prediction process, and means for performing a rate-distortion analysis with respect to the second order residual block and at least one of the first order residual blocks to substantially minimize a rate-distortion cost associated with encoding the given video block, wherein the rate-distortion analysis with respect to the second order residual block accounts for a combined effect of the first order prediction process and the second order prediction process in coding the given video block.

In another example, this disclosure describes a device for decoding video data, the device comprising means for receiving one bit per macroblock that defines whether second order prediction was used in an encoding process on the macroblock, and means performing a first order prediction process to identify a first order predictive block used to code a given video block. If the one bit indicates that second order prediction was not used, the device comprises means for decoding the given video block based on the first order predictive block. If the one bit indicates that second order prediction was used, the device comprises means for performing a second order prediction process to generate a second order predictive block used to code the given video block, wherein the second order prediction defines a pre-defined prediction mode. If the one bit indicates that second order prediction was used, the device comprises means for decoding the given video block based on the first order predictive block and the second order predictive block.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium and loaded and executed in the processor.

Accordingly, this disclosure also contemplates a computer-readable storage medium comprising instructions that upon execution by a processor cause the processor to encode video data, wherein the instructions cause the processor to perform a first order prediction process to generate at least two first order residual blocks for a given video block being coded, perform a second order prediction process to generate at least one second order residual block for the given video block being coded based on one of the first order residual blocks and a pre-defined mode for the second order prediction process, and performing a rate-distortion analysis with respect to the second order residual block and at least one of the first order residual blocks to substantially minimize a rate-distortion cost associated with encoding the given video block, wherein the rate-distortion analysis with respect to the second order residual block accounts for a combined effect of the first order prediction process and the second order prediction process in coding the given video block.

In another example, this disclosure describes a computer-readable storage medium comprising instructions that upon execution by a processor cause the processor to decode video data, wherein upon receiving one bit per macroblock that defines whether second order prediction was used in an encoding process on the macroblock, the instructions cause the processor to perform a first order prediction process via the video decoder to identify a first order predictive block used to code a given video block. If the one bit indicates that second order prediction was not used, the instructions cause the processor to decode the given video block based on the first order predictive block. If the one bit indicates that second order prediction was used, the instructions cause the processor to perform a second order prediction process via the video decoder to generate a second order predictive block used to code the given video block, wherein the second order prediction define a pre-defined prediction mode. If the one bit indicates that second order prediction was used, the instructions cause the processor to decode the given video block based on the first order predictive block and the second order predictive block.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
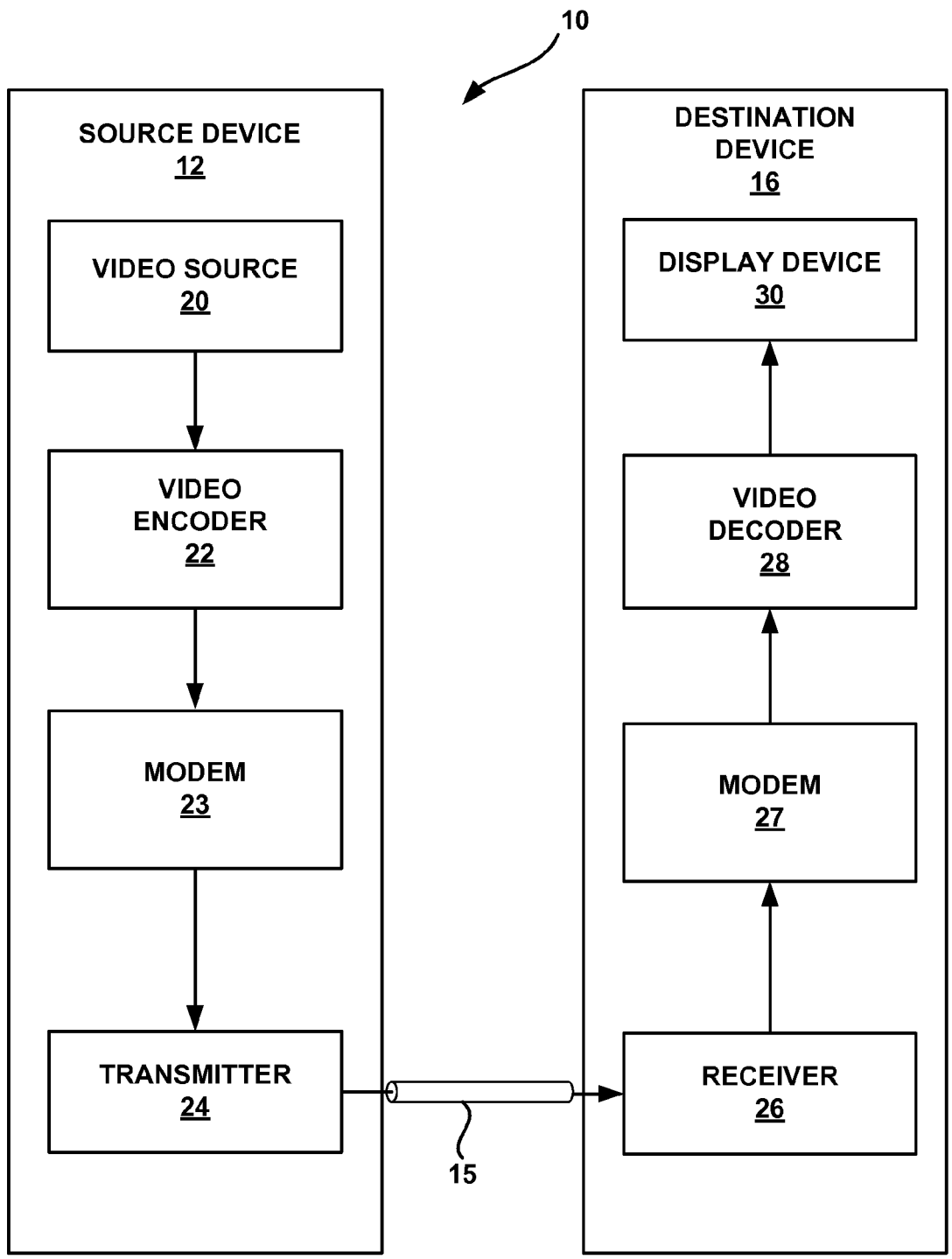
FIG. 1 is a block diagram illustrating one exemplary video encoding and decoding system that may implement techniques of this disclosure.

This disclosure describes video encoding and decoding techniques in which a first order prediction process and a second order prediction process are used in combination to generate predictive video blocks in the encoding and decoding of video data. First order prediction may include motion estimation and motion compensation processes in which a video block being coded is compared to reference video blocks to identify a predictive video block, which is then subtracted from the video block being encoded in order to generate a residual video block. The second order prediction may involve a process similar to conventional intra-prediction, but unlike conventional intra-prediction, the second order prediction is performed on the residual video block. The techniques of this disclosure may pre-define the second order prediction to a specific mode, such as a mode similar to the intra-DC mode used in intra coding. In addition, the techniques of this disclosure may combine aspects of the first order and second order prediction into a single process so that the effects of second order prediction on the residuals are taken into account during the first order prediction process, which may improve compression.

The techniques of this disclosure may apply to specific types of macroblocks within P-slices and B-slices, or other types of coded units such as frames or groups of pictures (GOPs). The techniques may apply with respect to any predicted macroblocks, but may not apply to skipped macroblocks or direct mode macroblocks that have a coded block pattern (CBP) that is zero. Additional details on different types of macroblocks that may be coded according to the techniques of this disclosure are provided below. In general, a macroblock may refer to a set of chrominance and luminance values that define a 16 by 16 area of pixels. A luminance block (L) may comprise a 16 by 16 set of values, but may be further partitioned into smaller video blocks, such as 8 by 8 blocks, 4 by 4 blocks, 8 by 4 blocks, 4 by 8 blocks or other sizes. Two different chrominance blocks (u and v) may define color for the macroblock, and may each comprise 8 by 8 sub-sampled blocks of the color values associated with the 16 by 16 area of pixels.

Second order prediction may comprise an enhancement to first order block-based video coding common in MPEG-4, ITU H.264, and other coding standards. In first order block-based video coding, a motion estimation process may be used to identify a predictive video block of a different coded unit (e.g., a different frame or slice) that sufficiently matches the video block being coded. The predictive video block may be generated by a motion compensation process, and then subtracted from the video block being coded to generate a residual video block indicative of the differences between the video block being coded and the predictive video block. A motion vector refers to the syntax element that is encoded and used by the decoder to locate, e.g., in another frame or slice, the same predictive video block that was used to generate the residual video block at the encoder. This type of first order predictive video coding can achieve data compression by exploiting temporal redundancy between data in a video sequence. The residual block and the motion vector that identifies the predictive block used to form the residual block are sent in the bitstream following transform coding and quantization, and this data may be significantly less than the amount of data that would otherwise be needed to communicate the same video block without using predictive encoding.

Second order prediction may extend the block-based video coding a step further. In second order prediction, the residual block generated during the first order prediction may itself be predictively coded. Second order prediction modes may be similar to conventional intra-prediction modes. Many different types of second order prediction modes may be applied to define predictive data based on spatially adjacent data within the same coded unit. In second order prediction, a set of adjacent residual data may be used to define a second order predictive block, which may be further subtracted from the first order residual block to generate a second order residual block. This second order process may yield additional compression relative to a first order prediction process alone. Unfortunately, second order prediction may introduce substantial complexities to the coding process and may require additional syntax elements in the encoded video data.

For example, second order prediction may add complexity in terms of the amount of data being considered in the second order prediction process. Intra-coding consistent with ITU H.264, for example, may include nine or more different intra modes. If similar types of modes were considered for second order prediction, the encoding complexity could become undesirably complicated. In this case, first order residual blocks may have nine different second order perturbations for every possible second order mode. In addition, second order prediction may require substantial additions to syntax information in encoded video data, particularly if several different second order coding modes are supported. In this case, the encoder may need to specify how the second order coding was performed by the encoder so that the reciprocal process may be applied at the decoder.

The techniques of this disclosure may achieve a desirable balance between the desirable compression that can be achieved via second order prediction and the undesirable complexities that can also result from second order prediction. This disclosure provides for a single second order prediction mode, which may be pre-defined and known at the encoder and the decoder. In this way, the additional syntax needed to support second order prediction can be reduced to a single bit for candidate macroblocks, e.g., simply defining whether or not the second order prediction was used for a given macroblock. Since the second order prediction mode is pre-defined and known at the encoder and the decoder, it is unnecessary to provide information in the bitstream to identify how the second order coding was performed by the encoder.

In addition, the techniques of this disclosure may combine aspects of first order prediction and second order prediction into one process for purposes of rate-distortion analysis of the coded video block candidates. For example, rather than performing a first order process to produce a most desirable first order residual, and then performing a second order process on that most desirable first order residual, the techniques of this disclosure may identify a first motion vector for the first order prediction of the given video block based on a first assumption that the second order prediction will not be used, and identify a second motion vector for the first order prediction of the given video block based on a second assumption that the second order prediction will be used. The second motion vector may be different than the first motion vector.

The best first order residual may be different if the encoder not only considers the results of the first order prediction process, but also considers the results of the second order prediction process that will be subsequently performed on first order residual candidates. Luminance changes caused by flashes or lighting changes in a video sequence, for example, may be compressed more effectively by the combined first order and second order prediction processes, consistent with this disclosure.

FIG. 1 is a block diagram illustrating one exemplary video encoding and decoding system 10 that may implement techniques of this disclosure. As shown in FIG. 1, system 10 includes a source device 12 that transmits encoded video to a destination device 16 via a communication channel 15. Source device 12 and destination device 16 may comprise any of a wide range of devices. In some cases, source device 12 and destination device 16 comprise wireless communication devices, such as wireless handsets, so-called cellular or satellite radiotelephones, or any devices that can communicate video information over a communication channel 15, which may or may not be wireless. The techniques of this disclosure, however, which concern a pre-defined second order prediction mode and combination of aspects of first order prediction and second order prediction into one process for purposes of rate-distortion analysis, are not necessarily limited to wireless applications or settings. The techniques of this disclosure may be used in any device that encodes or decodes video data in the manner described herein.

In the example of FIG. 1, source device 12 may include a video source 20, video encoder 22, a modulator/demodulator (modem) 23 and a transmitter 24. Destination device 16 may include a receiver 26, a modem 27, a video decoder 28, and a display device 30. In accordance with this disclosure, video encoder 22 of source device 12 may be configured to apply a pre-defined second order prediction mode so that first order prediction and second order prediction can be combined into one process for purposes of a rate-distortion analysis. Video decoder 28 may receive syntax elements that comprise one bit per macroblock (for those specific macroblocks that may possibly use second order prediction) to indicate whether second order prediction was used in the encoding. Video decoder 28 may be programmed with a pre-defined second order prediction mode, and may perform second order prediction for selected macroblocks based on the one bit per macroblock syntax in the received bitstream.

The illustrated system 10 of FIG. 1 is merely exemplary. The techniques of this disclosure may be extended to any coding device or technique that supports first order block-based video coding. Source device 12 and destination device 16 are merely examples of such coding devices in which source device 12 generates coded video data for transmission to destination device 16. In some cases, devices 12, 16 may operate in a substantially symmetrical manner such that, each of devices 12, 16 includes video encoding and decoding components. Hence, system 10 may support one-way or two-way video transmission between video devices 12, 16, e.g., for video streaming, video playback, video broadcasting, or video telephony.

Video source 20 of source device 12 may include a video capture device, such as a video camera, a video archive containing previously captured video, or a video feed from a video content provider. As a further alternative, video source 20 may generate computer graphics-based data as the source video, or a combination of live video, archived video, and computer-generated video. In some cases, if video source 20 is a video camera, source device 12 and destination device 16 may form so-called camera phones or video phones. In each case, the captured, pre-captured or computer-generated video may be encoded by video encoder 22. The encoded video information may then be modulated by modem 23 according to a communication standard, e.g., such as code division multiple access (CDMA) or another communication standard, and transmitted to destination device 16 via transmitter 24. Modem 23 may include various mixers, filters, amplifiers or other components designed for signal modulation. Transmitter 24 may include circuits designed for transmitting data, including amplifiers, filters, and one or more antennas.

Receiver 26 of destination device 16 receives information over channel 15, and modem 27 demodulates the information. Again, the video encoding process may implement one or more of the techniques described herein to apply a pre-defined second order prediction mode as part of a combined first order and second order prediction process. The information communicated over channel 15 may include information defined by video encoder 22, which may be used by video decoder 28 consistent with this disclosure. Display device 30 displays the decoded video data to a user, and may comprise any of a variety of display devices such as a cathode ray tube, a liquid crystal display (LCD), a plasma display, an organic light emitting diode (OLED) display, or another type of display device.

In the example of FIG. 1, communication channel 15 may comprise any wireless or wired communication medium, such as a radio frequency (RF) spectrum or one or more physical transmission lines, or any combination of wireless and wired media. Accordingly, modem 23 and transmitter 24 may support many possible wireless protocols, wired protocols or wired and wireless protocols. Communication channel 15 may form part of a packet-based network, such as a local area network (LAN), a wide-area network (WAN), or a global network, such as the Internet, comprising an interconnection of one or more networks. Communication channel 15 generally represents any suitable communication medium, or collection of different communication media, for transmitting video data from source device 12 to destination device 16. Communication channel 15 may include routers, switches, base stations, or any other equipment that may be useful to facilitate communication from source device 12 to destination device 16. The techniques of this disclosure do not necessarily require communication of encoded data from one device to another, and may apply to encoding scenarios without the reciprocal decoding.

Video encoder 22 and video decoder 28 may operate consistent with a video compression standard, such as the ITU-T H.264 standard, alternatively described as MPEG-4, Part 10, Advanced Video Coding (AVC). The techniques of this disclosure, however, are not limited to any particular coding standard or extensions thereof. Although not shown in FIG. 1, in some aspects, video encoder 22 and video decoder 28 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard, but extend the encoding to provide for second order prediction consistent with this disclosure. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Work to advance the H.264/MPEG-4 AVC standard takes place in various forums of the ITU-T, such as the Key Technologies Area (KTA) forum. The KTA forum seeks, in part, to develop coding technologies that exhibit higher coding efficiency than that exhibited by the H.264/AVC standard. The techniques described in this disclosure may provide for coding improvements relative to the H.264/AVC standard.

Video encoder 22 and video decoder 28 each may be implemented as one or more microprocessors, digital signal processors (DSPs), application specific integrated circuits (ASICs), field programmable gate arrays (FPGAs), discrete logic, software, hardware, firmware or any combinations thereof. Each of video encoder 22 and video decoder 28 may be included in one or more encoders or decoders, either of which may be integrated as part of a combined encoder/decoder (CODEC) in a respective mobile device, subscriber device, broadcast device, server, or the like.

A video sequence typically includes a series of video frames. Video encoder 22 and video decoder 28 may operate on video blocks within individual video frames in order to encode and decode the video data. The video blocks may have fixed or varying sizes, and may differ in size according to a specified coding standard. Each video frame may include a series of slices or other independently decodable units. Each slice may include a series of macroblocks, which may be arranged into sub-blocks. As an example, the ITU-T H.264 standard supports intra prediction in various block sizes, such as 16 by 16, 8 by 8, or 4 by 4 for luma components, and 8×8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components. Video blocks may comprise blocks of pixel data, or blocks of transformation coefficients, e.g., following a transformation process such as discrete cosine transform or a conceptually similar transformation process.

Smaller video blocks can provide better resolution, and may be used for locations of a video frame that include high levels of detail. In general, macroblocks and the various sub-blocks or partitions may all be considered to be video blocks. In addition, a slice may be considered to be a series of video blocks, such as macroblocks and/or sub-blocks or partitions. In general a macroblock may refer to a set of chrominance and luminance values that define a 16 by 16 area of pixels. A luminance block may comprise a 16 by 16 set of values, but may be further partitioned into smaller video blocks, such as 8 by 8 blocks, 4 by 4 blocks, 8 by 4 blocks, 4 by 8 blocks or other sizes. Two different chrominance blocks may define color for the macroblock, and may each comprise 8 by 8 sub-sampled blocks of the color values associated with the 16 by 16 area of pixels. Macroblocks may include syntax information to define the coding modes and/or coding techniques applied to the macroblocks.

Macroblocks or other video blocks may be grouped into decodable units such as slices, frames or other independent units. Each slice may be an independently decodable unit of a video frame. Alternatively, frames themselves may be decodable units, or other portions of a frame may be defined as decodable units. The term "coded unit" refers to any independently decodable unit of a video frame such as an entire frame, a slice of a frame, a group of pictures (GOPs), or another independently decodable unit defined according to the coding techniques used.

Following inter-based predictive encoding (which includes the first and second order prediction described herein), and following any transforms (such as the 4×4 or 8×8 integer transform used in H.264/AVC or a discrete cosine transform or DCT), quantization may be performed. Quantization generally refers to a process in which coefficients are quantized to possibly reduce the amount of data used to represent the coefficients. The quantization process may reduce the bit depth associated with some or all of the coefficients. For example, a 16-bit value may be rounded down to a 15-bit value during quantization. Following quantization, entropy coding may be performed, e.g., according to content adaptive variable length coding (CAVLC), context adaptive binary arithmetic coding (CABAC), or another entropy coding methodology.

For intra-coding of one or more types of predicted macroblocks, video encoder 22 may perform a first order prediction process to generate at least two first order residual blocks for a given video block being coded, and perform a second order prediction process to generate at least one second order residual block for the given video block being coded based on one of the first order residual blocks and a pre-defined mode for the second order prediction process. Video encoder 22 may then perform a rate-distortion analysis with respect to the second order residual block and at least one of the first order residual blocks to substantially minimize a rate-distortion cost associated with encoding the given video block, wherein the rate-distortion analysis with respect to the second order residual block accounts for a combined effect of the first order prediction process and the second order prediction process in coding the given video block. According to this disclosure, the effects of second order prediction on the residuals are taken into account by video encoder 22 during the first order prediction process (specifically for rate-distortion analysis), which may improve compression.

The first order prediction process may comprise motion estimation and motion compensation similar to conventional video coding, e.g., as prescribed by the H.264 standard. The second order prediction process may comprise a process of generating second order predictive data based on neighboring residual data relative to the first order residual blocks. The pre-defined mode for the second order prediction process may comprise a single mode that is similar to any one of the conventional intra modes, but different than conventional intra modes insofar as the second order prediction mode may apply to residual pixel data rather than original pixel data. The pre-defined mode, for example, may comprise a DC mode in which a set of second order predictive values are defined as an average of a set of neighboring residual values.

In performing the first order prediction process, video encoder 22 may identify a first motion vector for the first order prediction of the given video block based on a first assumption that the second order prediction will not be used, and identify a second motion vector for the first order prediction of the given video block based on a second assumption that the second order prediction will be used. The second motion vector may be different than the first motion vector, although it is possible that the second motion vector and the first motion vector could be the same. The second order prediction process may comprise a process of generating second order predictive data based on neighboring residual values relative to one of the first order residual blocks. For purposes of identifying the second motion vector for the first order prediction of the given video block based on the second assumption, at least some of the neighboring residual values may be estimated based on at least some original pixels values defined prior to any transformation, quantization, de-quantization or inverse transformation by the encoder. In this case, reconstructed neighboring residual values may be unavailable at the time that the first order prediction is performed for purposes of rate-distortion analysis. However, the original neighboring pixels may be sufficiently similar to the reconstructed neighboring residual values for purposes of generating estimations used in the rate-distortion analysis.

Video encoder 22 may also encode a syntax element to indicate whether second order prediction was used, and the syntax element may be simplified to one bit per macroblock, consistent with this disclosure. For example, a bit value of "1" may indicate that the second order process was used to encode the macroblock, whereas a bit value of "0" may indicate that the second order process was not used. In the latter case, only the first order encoding process was used.

Figure 2:
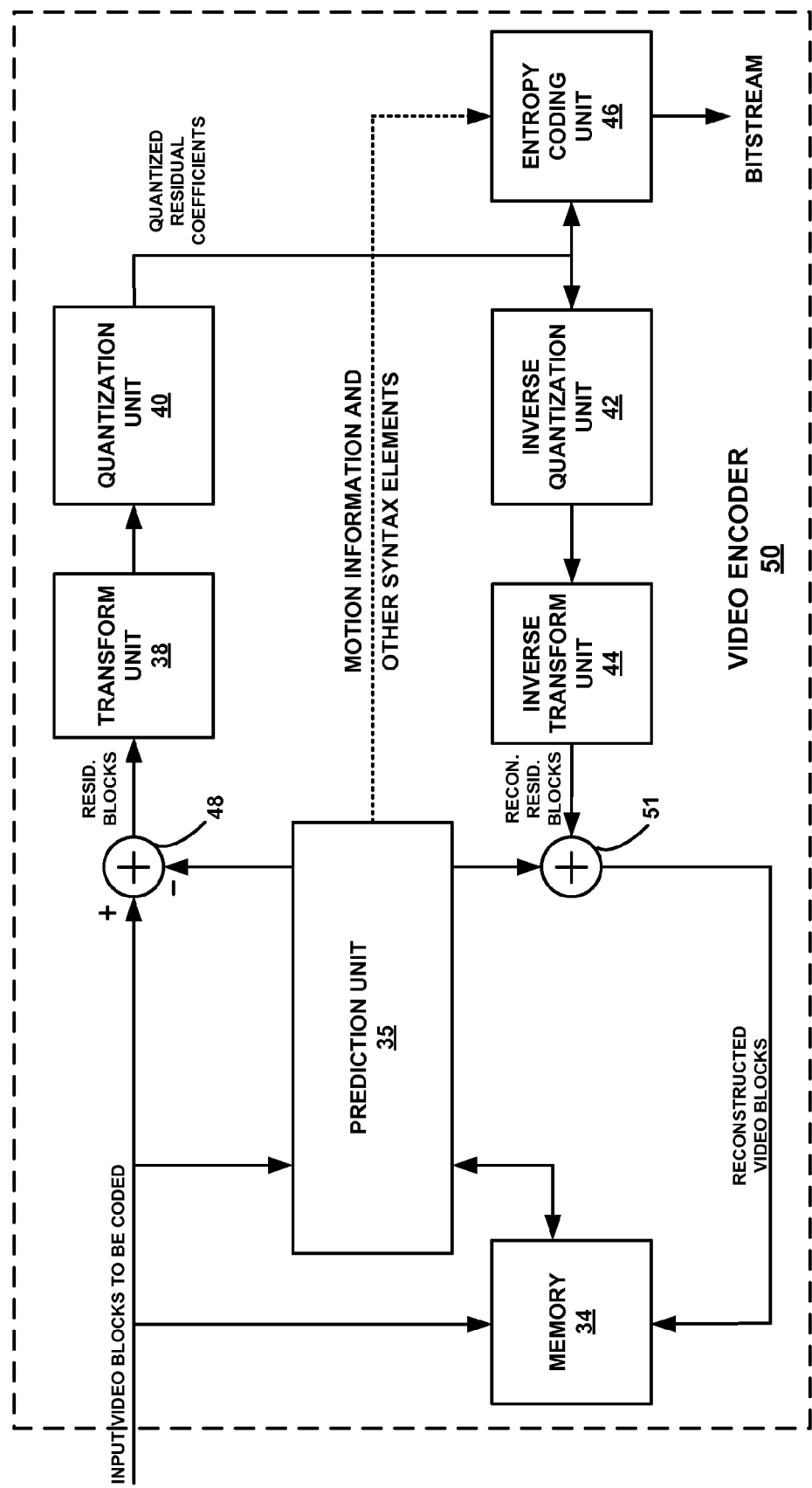
FIG. 2 is a block diagram illustrating an example of a video encoder that may perform first order and second order prediction consistent with this disclosure.

FIG. 2 is a block diagram illustrating an example of a video encoder 50 that may perform techniques consistent with this disclosure. Video encoder 50 may correspond to video encoder 22 of source device 12, or a video encoder of a different device. Video encoder 50 may perform intra- and inter-coding of blocks within video frames, although intra-coding components are not shown in FIG. 2 for ease of illustration. Intra-coding relies on spatial prediction to reduce or remove spatial redundancy in video within a given video frame. Inter-coding relies on temporal prediction to reduce or remove temporal redundancy in video within adjacent frames of a video sequence. Intra-mode (I-mode) may refer to the spatial based compression mode and Inter-modes such as prediction (P-mode) or bi-directional (B-mode) may refer to the temporal based compression modes.

As shown in FIG. 2, video encoder 50 receives a current video block within a video frame or slice to be encoded. In the example of FIG. 2, video encoder 50 includes a prediction unit 35, a memory 34, an adder 48, a transform unit 38, a quantization unit 40, and an entropy coding unit 46. For video block reconstruction, video encoder 50 also includes an inverse quantization unit 42, an inverse transform unit 44, and an adder 51. Video encoder 50 may also include a deblocking filter (not shown) to filter block boundaries to remove blockiness artifacts from reconstructed video. If desired, the deblocking filter would typically filter the output of adder 51.

During the encoding process, video encoder 50 receives a video block to be coded, and prediction unit 35 performs inter-predictive coding consistent with this disclosure. Prediction unit 35 may include a first order unit (not shown in FIG. 2) that includes motion estimation and motion compensation units that perform first order encoding. In addition, prediction unit 35 may include a second order unit (not shown) that may perform second order predictive coding as defined by a pre-selected mode, as described herein.

Second order prediction (sometime abbreviated "SOP") is may be an enhancement to the ITU H.264 process for encoding various macroblocks in P- and B-slices or other coded units. In second order prediction, traditional motion partitions of the macroblock are first encoded via first order encoding, which may include motion compensated prediction of a residual block. The macroblock partitions may comprise a 16 by 16 partition, a 16 by 8 partition, a 8 by 16 partition, an 8 by 8 partition, a 4 by 4 partition, an 8 by 4 partition, a 4 by 8 partition, or possibly other sized partitions. After forming a first order residual block, prediction unit 35 may apply second order prediction to the residual block that is formed in the first order step. Conventionally, second order prediction is performed only after the first order prediction is complete, and second order prediction may use nine modes that are similar to those common in intra prediction. Second order prediction may also use the same pixel support (e.g., the same filtering and/or interpolations) used for performing intra prediction.

The difference between intra prediction and second order predictive coding is that, instead of using encoded pixel values from the support region for performing the prediction, the motion compensated prediction residual data is used for the second order prediction process. That is, second order prediction generally predicts residual blocks based on other residual data. The predictive residual data may be calculated using the same motion vector as that of the motion partition block being encoded in order to locate and define residual data that is adjacent the block being encoded. Predictive second order data is subtracted from the prediction residual and the remainder (called a second order residual) may be transformed via unit 38, quantized via unit 40, and entropy-coded via unit 46, in a manner similar to conventional ITU H.264 coding units.

One of the main drawbacks of second order prediction is the added complexity in the encoder. In addition to the normal steps necessary for making a rate-distortion decision for encoding a macroblock, it may be necessary to perform intra-like prediction on the macroblock for each motion partition with small transform sizes of e.g., 8 by 8 and 4 by 4. This increase in complexity can be prohibitively costly in terms of processing complexity compared to the gains in compression and quality (or rate reduction) that may be achieved.

To address these concerns on encoder complexity, as described in this disclosure, prediction unit 35 may limit second order prediction to a single mode, rather than multiple modes. In one example, prediction unit 35 may use only so-called DC prediction (which may be similar to second order mode 2 of conventional intra-prediction). This limitation to DC-prediction (or another pre-defined mode) can substantially reduce complexity of video encoder 50, as prediction unit 35 only needs to evaluate the results of one second order prediction mode, instead of nine modes for every candidate video block that may use second order prediction. In addition, another added benefit to the approach described herein is syntax simplification. Only one flag, e.g., one bit per macroblock, may be needed to signal to the decoder whether or not second order prediction was used for a particular macroblock. The syntax bit may be provided, for example, in a macroblock header. More complex syntax for defining the second order mode can be eliminated by limiting the mode to a single pre-defined mode. Furthermore, since there is only one pre-defined mode, the second order prediction may be combined with the first order prediction for purposes of performing rate-distortion analysis. This allows first order residuals that would have otherwise been avoided to be identified and used due to the second order affects on such first order residuals. In this case, the motion vector defined for the best first order mode (assuming second order prediction is not used) may differ from the motion vector defined for the best first order mode assuming that second order prediction will be used.

The techniques of this disclosure may apply only to P-slices and B-slices (or other P- or B-coded units), but not to I-slices. If encoder 50 is encoding a macroblock, prediction unit 35 may first derive a motion vector for a so-called 'skip' mode (for P-slice) or so-called 'direct' mode (for B-slice). For a P-slice, the rate-distortion cost (rdcost) of the 'skip' mode may be evaluated by setting the motion compensated prediction residual to zero. For a B-slice, after forming motion compensated prediction residual using a derived motion vector, the prediction residual may be transformed using a 4×4 or 8×8 transform, quantized and entropy-coded. In this case, if the coded block pattern (CBP) is zero, this may be equivalent to a 'skip' mode for the P-slice macroblock. Thus, reference to a 'skip' mode for B-slice, may be equivalent to a 'direct' mode with coded block pattern of zero. For 'skip' mode as well as for intra-coding modes, prediction unit 35 may avoid any second order encoding. If a B-slice has 'direct' mode macroblocks in which the coded block pattern is non-zero, that mode may be treated as all the other modes described below, in which case prediction unit 35 may perform the second order prediction. In short, all modes of P- or B-video blocks may support second order prediction, with the exception of 'skip' mode for P-slice video blocks, and 'direct' mode for B-slice video blocks that also define a coded block pattern of zero Prediction unit 35 of encoder 50 may perform motion estimation for each video block partition. In the case of an 8 by 8 P-video block partition, for example, a predictive partition may be found (for 4×4 transform and 8×8 transform) in a first order encoding process. For rate-distortion decisions, prediction unit 35 calculates the rate-distortion cost (rdcost) for each applicable mode ('direct' with non-zero CBP, 16×16, 16×8, 8×16, and P_8×8) and for each transform (4×4 and 8×8). The P_8×8 mode refers to a mode for 8×8 blocks that may be further sub-partitioned according to ITU H.264. The rdcost may quantify the cost in terms of the number of bits used and the level of distortion in the coded data relative to the original video data. For each of the above modes, another rate-distortion cost (rdcost_SOP_DC) may be defined as part of a second order encoding process. Since there is only one second order prediction mode, there is only one additional second order prediction cost for every possible first order mode that also supports second order prediction, which may substantially reduce the complexity of the second order encoding relative to techniques that allow for several second order modes. The second order encoding process may be performed in three steps, consistent with the explanation below.

In the first step of the second order encoding process, depending on the transform size, for each 4×4 or 8×8 sub-block of the macroblock, a motion compensated prediction residual may be calculated by prediction unit 35 using the motion vectors already estimated for that motion partition in the first order encoding process. Let the motion vector be denoted by $(m_x, m_y)$, where x denotes the row direction and y denotes the column direction.

In the second step of the second order encoding process, prediction unit 35 may calculate an SOP DC prediction block and subtract the SOP DC prediction block from the motion compensated prediction residual block to form an SOP residual block (referred to herein as a second order residual block). Then, in the third step of the second order encoding process, prediction unit 35 may estimate the rate-distortion cost for SOP DC prediction for that particular mode. In this case, prediction unit 35 may transform the SOP residual block by the appropriate transform (4×4 or 8×8), and quantize and entropy-code the residual block to estimate the rate-distortion cost for SOP DC prediction for that particular mode that would result via units 38, 40 and 46. Prediction unit 35 may invoke units 38, 40 and 46 for this rate-distortion cost purpose, or may include similar units to units 38, 40 and 46 that are used for the rate-distortion analysis.

Prediction unit 35 may also calculate the rate-distortion cost for the intra-prediction modes (such as Intra_16×16 macroblock mode, Intra_8×8 macroblock mode, Intra_4×4 macroblock mode, and I_PCM macroblock mode). The Intra_16×16 macroblock mode, Intra_8×8 macroblock mode, Intra_4×4 macroblock mode, and I_PCM macroblock mode are all defined in ITU H.264. The rate-distortion costs for all the inter-prediction modes, their corresponding SOP DC prediction modes, intra-prediction modes and 'skip' mode may be compared by prediction unit 35 to identify the mode with the lowest rate-distortion cost, which may then be chosen. If the chosen mode is 'skip' or intra-prediction, the SOP flag may not be included in the macroblock syntax elements. Otherwise, after encoding the macroblock type, a one bit SOP flag may be encoded to indicate whether the SOP DC mode should be used in decoding that macroblock. Since, only one second order coding mode is used, it is not necessary to signal the type of second order coding mode that is used, and instead, a pre-defined mode may be programmed into the decoder.

In accordance with this disclosure, the second order encoding does not follow the first order encoding with respect to a rate-distortion selected residual of the first order encoding. Instead, the second order encoding is performed on first order residual candidates prior to any rate-distortion analysis. In this way, prediction unit 35 avoids a scenario where a first order residual that would be most desirable (due to second order encoding) is not selected because it is not as optimal as other first order residuals (in the absence of second order encoding). In other words, the first order encoding and second order encoding are not entirely separate processes, but rather, the second order encoding is an extension of first order encoding for certain coding modes, and rate-distortion decisions can consider the combined effects of first and second order encoding in making the desired coding mode selections.

Figure 3:
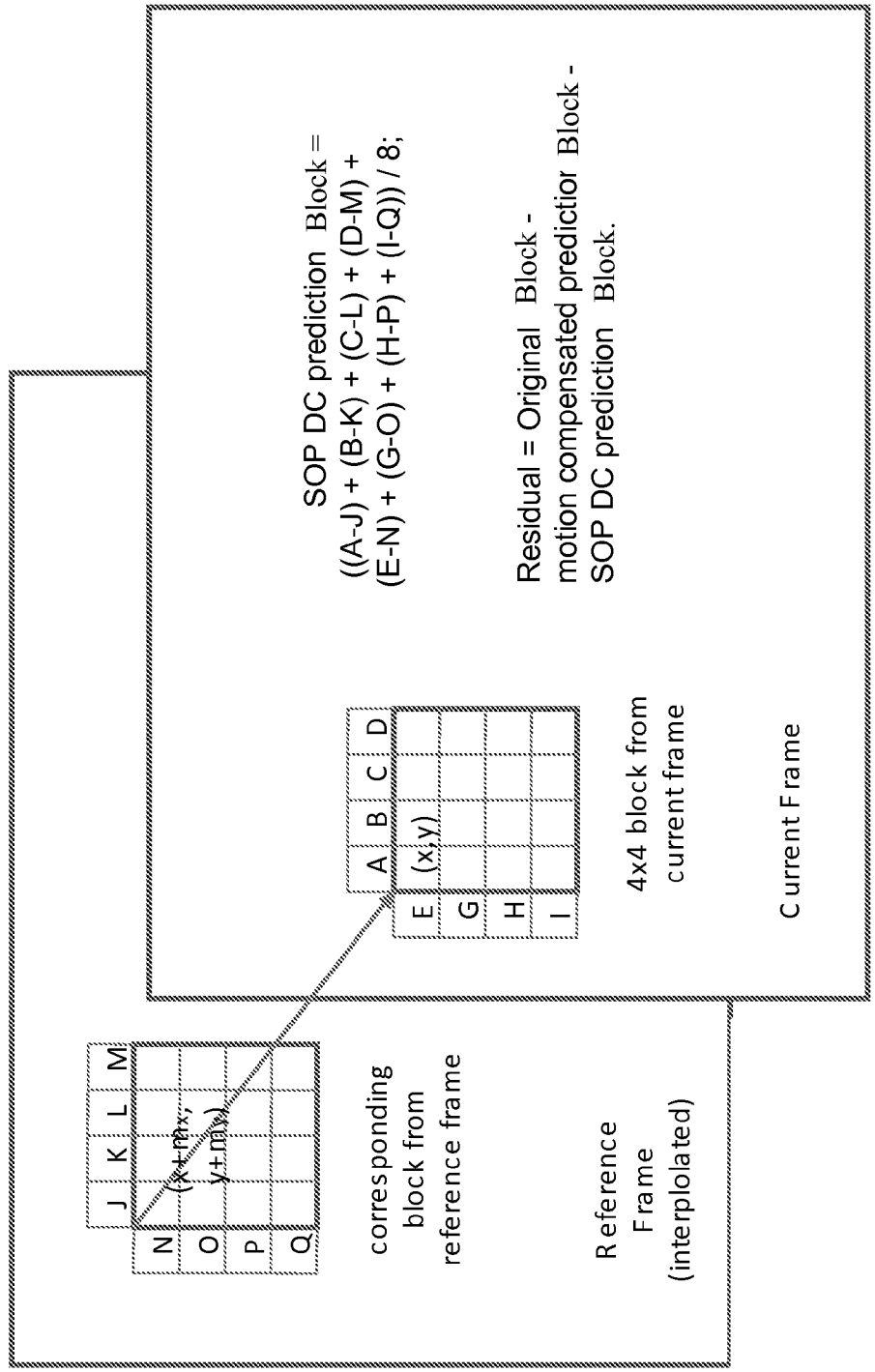
FIG. 3 is a conceptual diagram illustrating an exemplary process of second order prediction.

Referring again to the third step of the second order encoding process, the following is an example process of SOP DC prediction for a 4×4 block within a macroblock. The SOP DC prediction for an 8×8 block would be very similar. FIG. 3 is a conceptual illustration showing an exemplary 4×4 block and its 8 neighboring pixels (4 from row above and 4 from column to the left). The neighboring pixels from the row above are denoted by A, B, C, and D in FIG. 3. The neighboring pixels from the left column are denoted by E, F, G, and H. FIG. 3 also shows a 4×4 block from an exemplary reference frame and its neighboring pixels. The 4×4 block from the reference frame is shifted by $(m_x, m_y)$ with respect to the 4×4 block from the current frame, where $(m_x, m_y)$ is the estimated motion vector for the current 4×4 block. The motion vector components may be fractions in case of fractional pel accuracy. In that case, appropriate interpolation may be applied by a motion compensation unit of prediction unit 35 to generate the 4×4 block in the reference frame and its neighboring pixels.

Let the neighboring pixels for the 4×4 block from the reference frame be denoted by I, J, K, L, M, N, O, and P as shown in FIG. 3. Let reconstructed pixel values from the current frame be denoted by $\hat{I}$ and those from the reference by $\hat{I}_{ref}$. Then, the second order DC prediction may be formed as follows:

$$SOP\ DC\ \text{prediction} = \left( \begin{matrix} (\hat{I}(A) - \hat{I}_{ref}(I)) + (\hat{I}(B) - \hat{I}_{ref}(J)) + (\hat{I}(C) - \hat{I}_{ref}(K)) + \\ (\hat{I}(D) - \hat{I}_{ref}(L)) + (\hat{I}(E) - \hat{I}_{ref}(M)) + \\ (\hat{I}(F) - \hat{I}_{ref}(N)) + (\hat{I}(G) - \hat{I}_{ref}(O)) + (\hat{I}(H) - \hat{I}_{ref}(P)) \end{matrix} \right) \Big/ 8$$

If the neighboring pixels are part of the current macroblock and reconstructed neighboring pixels are available during the encoding process then the reconstructed pixel values are for the second order DC prediction. If the top neighbors are part of another slice, the second order DC prediction may be performed using only the left neighbors:

$$SOP\ DC\ \text{prediction} = \left( \begin{array}{c} (\hat{I}(E) - \hat{I}_{ref}(M)) + (\hat{I}(F) - \hat{I}_{ref}(N)) + \\ (\hat{I}(G) - \hat{I}_{ref}(O)) + (\hat{I}(H) - \hat{I}_{ref}(P)) \end{array} \right) / 4$$

If the left neighbors are part of another slice, the second order DC prediction may be performed using only the top neighbors:

$$SOP\ DC\ \text{prediction} = \left( \begin{array}{c} (\hat{I}(A) - \hat{I}_{ref}(I)) + (\hat{I}(B) - \hat{I}_{ref}(J)) + \\ (\hat{I}(C) - \hat{I}_{ref}(K)) + (\hat{I}(D) - \hat{I}_{ref}(L)) \end{array} \right) / 4$$

If both the top and left neighbors belong to another slice, the second order DC prediction flag may be set to 0 to indicate that second order prediction is not used.

In other cases, however, where some or all of the neighbors belong to another slice, the second order DC prediction may be approximated based on original (e.g., non-reconstructed) data. In this case, the second order DC prediction for purposes of rate-distortion analysis may use original data that would approximate the actual data that will be used at the decoder insofar as the original data would not include any quantization errors or other encoding errors that might be in the reconstructed data.

In short, the set of neighboring residual values used in second order prediction for purposes of rate-distortion analysis may be determined based on reconstructed pixel values following transformation, quantization, de-quantization and inverse transformation by the encoder, or alternatively, the set of neighboring residual values may be determined based on at least some original pixels values defined prior to any transformation, quantization, de-quantization or inverse transformation by the encoder. If the neighboring data has not yet been encoded, then reconstructed neighboring data will not be available in the encoder. In this case, however, the non-encoded data may be a close approximation to the reconstructed data, and therefore, may be used in the encoding process for purposes of analyzing rate and distortion for purposes of mode selection.

It may be desirable to allow the motion vectors used for an inter-prediction mode and its corresponding SOP DC mode to be different, according to this disclosure. As an example, consider a 16×16 macroblock that has a constant luminance component equal to 128. Now consider a second macroblock within a valid motion search range from a previously encoded frame that can be used as a reference frame. Let the motion vector that matches the first block to the second block be $(m_x, m_y)$. Consider that this macroblock also has a constant luminance component equal to 140. Assume that if performing SOP DC prediction, the SOP DC prediction value is 12. So for the 16×16 mode, if the motion vector $(m_x, m_y)$ is chosen as the motion vector, after motion compensation, the prediction residual will have a constant value of 12 and after SOP DC prediction, the SOP residual will be zero everywhere within the 16×16 block. But if traditional motion search is performed, the sum of absolute differences (SAD) would be 3072, which is relatively high. So, in traditional motion search, the motion vector $(m_x, m_y)$ would, in all likelihood, not be chosen as the motion vector, even though it results in a SOP residual of zero and hence would have very low rate-distortion. To rectify this, the techniques of this disclosure perform a modified motion vector search for SOP DC modes that account for the combined effects of first and second order prediction.

In some motion vector searching techniques, for each candidate motion vector, instead of performing full rate-distortion calculation (motion compensation, transform, quantization, entropy-coding) a modified rate-distortion criterion may be used, which is based on the sum of absolute differences (SAD) and the cost of encoding the motion vector. Here, SAD refers to the sum of absolute differences between luminance pixel values of the block from the current frame and the displaced block from the reference frame. For second order prediction, the techniques of this disclosure may modify the rate-distortion criterion to use the sum of absolute values of the second order residual instead of using the sum of absolute values of the motion compensated prediction residual. Since the motion estimation is decoupled from actual coding of the motion compensated prediction residual, for certain 4×4 or 8×8 blocks which are not on the top and left boundary of the macroblock, it may be the case that certain boundary pixels from the current frame have not yet been encoded. In this case, the techniques of this disclosure may use the original pixel values for purposes of motion estimation.

It should also be noted that for each macroblock from a P-slice and B-slice, if the macroblock mode is not 'skip' or intra-prediction, then a one-bit second order prediction flag may be included in the bit-stream to indicate to the decoder whether second order prediction should be used for that macroblock. However, it may be unnecessary to send any additional information regarding second order prediction mode, since the second order prediction mode is pre-defined at the encoder and the decoder.

Figure 4:
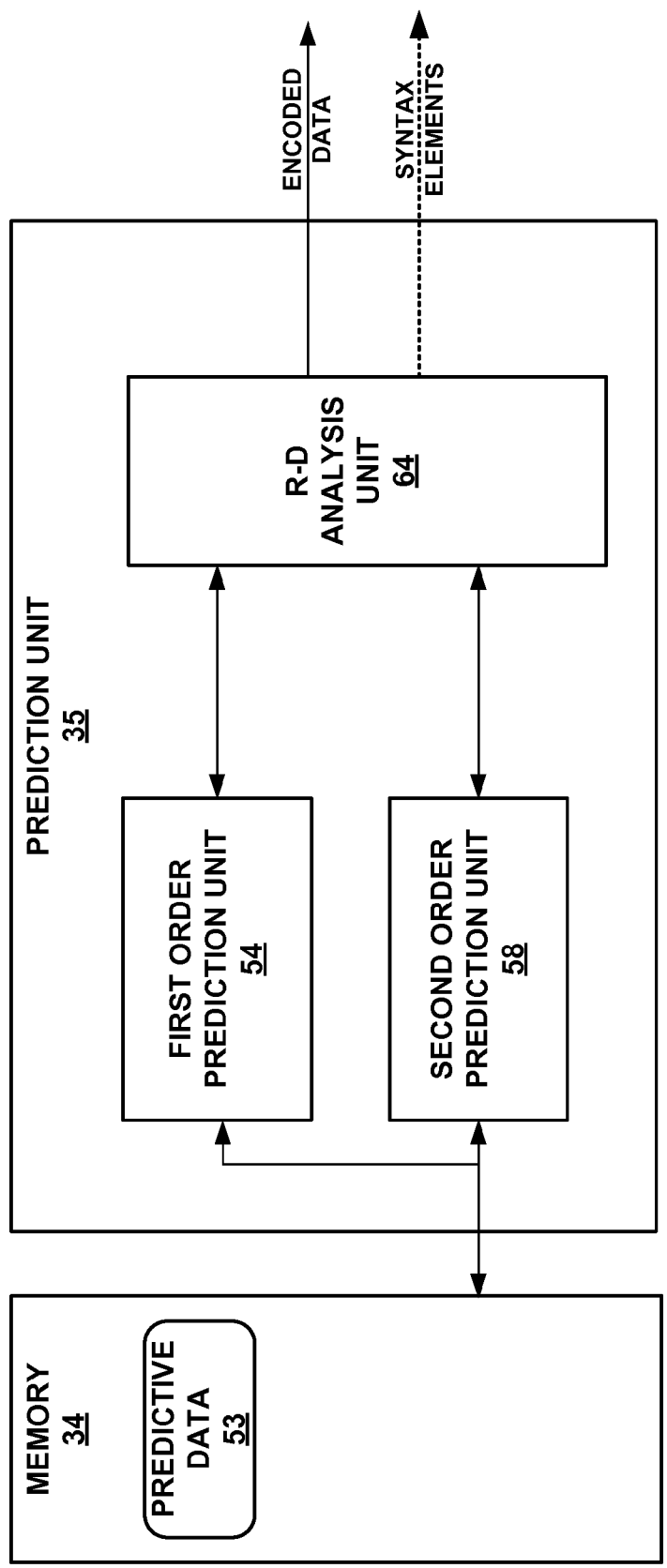
FIG. 4 is a block diagram illustrating an example of a prediction unit that supports first order and second order prediction.

FIG. 4 is a block diagram illustrating a prediction unit 35 coupled to a memory 34. The components of FIG. 4 may correspond to similarly numbered components in FIG. 3. Prediction unit 35 includes a first order prediction unit 54 that performs a first order prediction process to generate at least two first order residual blocks for a given video block being coded. Prediction unit 35 may consider several first order candidate video blocks within predictive data 53 in memory 34 during this first order process. First order prediction unit 54 may comprise a motion estimation unit and a motion compensation unit that generally perform first order prediction in a manner similar to conventional predictive coding such as defined by ITU H.264.

Prediction unit 35 also includes a second order unit 58 that performs a second order prediction process to generate at least one second order residual block for the given video block being coded based on one of the first order residual blocks and a pre-defined mode for the second order prediction process. The pre-defined mode may generate residual predictive data based on predictive data 53 in memory in a manner similar to conventional intra-coding using a DC mode to generate the predictive data based on neighboring data (in this case neighboring residual data). In other words, second order unit 58 generates second order predictive data based on neighboring residual values relative to the first order residual data. The second order predictive data may comprise a set of second order predictive values that are defined as an average of a set of neighboring residual values.

The first order prediction process performed by prediction unit 35 may include identifying a first motion vector for the first order prediction of the given video block based on a first assumption that the second order prediction will not be used, and identifying a second motion vector for the first order prediction of the given video block based on a second assumption that the second order prediction will be used, wherein the second motion vector is different than the first motion vector. In this way, the motion vector identified for first order prediction without second order prediction may be different than the motion vector identified for first order prediction with second order prediction.

The second order prediction process comprises a process of generating second order predictive data based on neighboring residual values relative to one of the first order residual blocks, wherein for purposes of identifying the second motion vector for the first order prediction of the given video block based on the second assumption, at least some of the neighboring residual values are estimated based on at least some original pixels values defined prior to any transformation, quantization, de-quantization or inverse transformation by the encoder. In this case, the original residual pixel data may provide a good estimation of reconstructed residual data that will be available to the decoder.

Prediction unit 35 also includes a rate-distortion (R-D) analysis unit 64 that performs a rate distortion analysis with respect to the second order residual block and at least one of the first order residual blocks to substantially minimize a rate-distortion cost associated with encoding the given video block. The rate distortion analysis with respect to the second order residual block may account for a combined effect of the first order prediction process and the second order prediction process in coding the given video block. In this way, the first order predictive data is not selected independently from the second order predictive data. Instead, R-D analysis unit 64 considers the combined effect of first and second order predictive encoding by units 54 and 58 when making its mode selections that minimize the rate-distortion cost. Accordingly, the first order prediction selected by R-D analysis unit 64 for first order prediction unit 54 accounts for the known effects that second order prediction will have on the first order residual. Put another way, the second order prediction mode selected by R-D analysis unit 64 may define a best first order prediction vector (first order motion vector) that may be different than the best first order prediction vector (first order motion vector) that would have otherwise been used in the absence of second order encoding.

The output of prediction unit 35 may include encoded data (e.g., first order or second order residuals) and various syntax elements, such as motion vectors or encoding mode information. This data may be, in turn, encoded via one or more additional encoding units such as transform unit 38, quantization unit 40 and entropy coding unit 46, shown in FIG. 2. In accordance with this disclosure, the syntax elements may include one bit per macroblock (for those macroblocks that can be encoded via second order prediction) to indicate whether second order prediction should be used by a decoder.

Rate-distortion (RD) analysis is fairly common in video coding, and generally involves the calculation of a cost metric indicative of the coding cost. The cost metric may balance the number of bits required for the coding (the rate) and the level of quality associated with the coding (the distortion). A typical rate-distortion cost calculation may generally correspond to the format of:

$$J(\lambda) = \lambda R + D,$$

where $J(\lambda)$ is the cost, R is the bit rate, D is the distortion, and $\lambda$ is the Lagrange multiplier. R-D unit 64 may apply this type of cost function to compare modes that perform first order encoding to modes that perform both first and second order encoding in order to define the most desirable encoding mode for a given video block.

Once the desired prediction data is identified by motion compensation unit 35, as described herein, video encoder 50 forms a residual video block by subtracting the prediction data from the original video block being coded to generate a first order residual (and possibly subtracting the first order residual from second order predictive data to generate a second order residual). Adder 48 represents the component or components that perform these subtraction operations. Transform unit 38 applies a transform, such as a discrete cosine transform (DCT) or a conceptually similar transform, to the first or second order residual block, producing a video block comprising residual transform block coefficients (either first or second order depending on the mode that was selected for that video block). Transform unit 38, for example, may perform other transforms, such as those defined by the H.264 standard, which are conceptually similar to DCT. Wavelet transforms, integer transforms, sub-band transforms or other types of transforms could also be used. In any case, transform unit 38 applies the transform to the residual block, producing a block of residual transform coefficients. The transform may convert the residual information from a pixel domain to a frequency domain.

Quantization unit 40 quantizes the residual transform coefficients to further reduce bit rate. The quantization process may reduce the bit depth associated with some or all of the coefficients. For example, a 9-bit value may be rounded down to an 8-bit value during quantization. In addition, quantization unit 40 may also quantize the different offsets for cases where offset is used.

Following quantization, entropy coding unit 46 entropy codes the quantized transform coefficients. For example, entropy coding unit 46 may perform content adaptive variable length coding (CAVLC), context adaptive binary arithmetic coding (CABAC), or another entropy coding methodology. Following the entropy coding by entropy coding unit 46, the encoded video may be transmitted to another device or archived for later transmission or retrieval. The coded bitstream may include entropy coded residual blocks, motion vectors for such blocks, and other syntax such as the syntax described herein.

Inverse quantization unit 42 and inverse transform unit 44 apply inverse quantization and inverse transformation, respectively, to reconstruct the first order or second order residual block in the pixel domain, e.g., for later use as the reference data in the manner described above. Adder 51 adds the reconstructed residual block to first and/or second order prediction blocks produced by motion compensation unit 35 to produce a reconstructed video block for storage in memory 34. The reconstructed video block and residual data may be used by motion compensation unit 35 as a reference block to inter-encode a block in a subsequent video frame or other coded unit.

Figure 5:
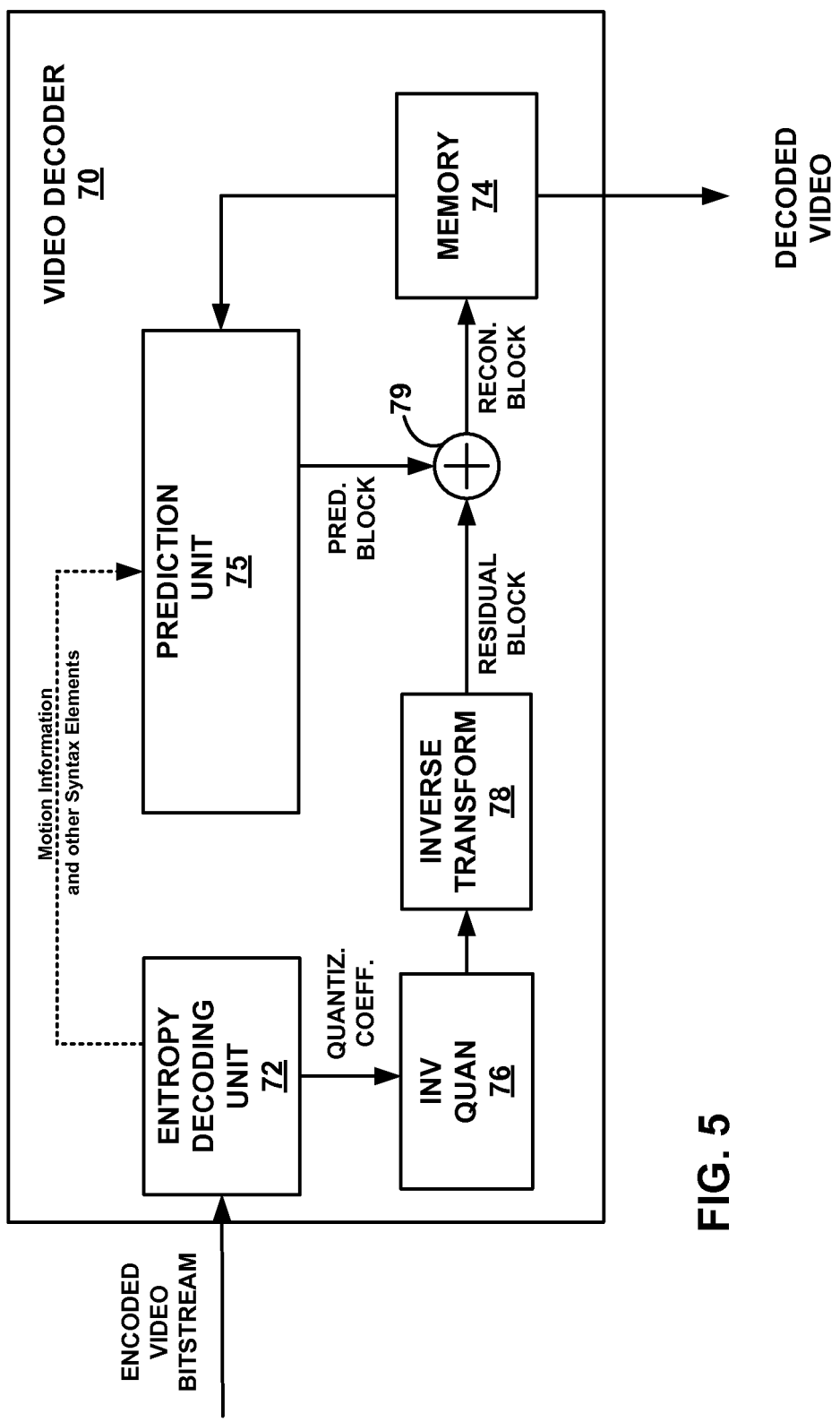
FIG. 5 is an example of a video decoder that may perform first order and second order prediction techniques consistent with this disclosure.

FIG. 5 is a block diagram illustrating an exemplary video decoder 70, which may perform the reciprocal decoding techniques to the encoding techniques described above. Video decoder 70 may include an entropy decoding unit 72, a prediction unit 75, an inverse quantization unit 76, an inverse transform unit 78, a memory 74 and adder 79. Prediction unit 75 may include a motion compensation (MC) unit 88, as well as spatial prediction components, which are not shown for simplicity and ease of illustration.

Video decoder 70 may receive an encoded video bitstream that includes video blocks encoded in the manner described herein, and various syntax elements that may be used by decoder 70 to facilitate the proper decoding of the video blocks. In particular, video decoder 70 may receive one bit per macroblock (for those macroblocks that can be encoded via first and second order prediction) that defines whether second order prediction was used for the macroblock. Prediction unit 75 may perform a first order prediction process to identify a first order predictive block used to code a given video block. If the one bit indicates that second order prediction was not used, video decoder 70 may decode the given video block based on the first order predictive block. In this case, a residual block may be inverse quantized by inverse quantization unit 76 and inverse transformed by inverse transform unit before being combined with the prediction block via adder 79 to generate a reconstructed block that may be stored in memory 74 as decoded video.

If the one bit indicates that second order prediction was used, prediction unit 75 may perform a second order prediction process to generate a second order predictive block used to code the given video block, wherein the second order prediction comprises a pre-defined prediction mode. As described herein, the second order predictive block may comprise predictive residual data defined based on neighboring residual data relative to given video block, and the pre-defined mode of the second order prediction process defines a DC mode in which a set of second order predictive values are defined as an average of a set of neighboring residual values relative to given video block.

When the one bit indicates that second order prediction was used, the residual block that is input to adder 79 may comprise a second order residual block. In this case, video decoder 70 decodes the given video block based on the first order predictive block and the second order predictive block. Specifically, adder 79 may combine the second order residual with the second order predictive block generated by prediction unit 75 to generate a reconstructed first order residual. Adder 79 may also add the first order predictive block generated by prediction unit 75 to the reconstructed first order residual in order to generate the reconstructed video block in the pixel domain. The reconstructed video block may then be stored in memory 74 as decoded video. In this way, video decoder 70 performs the reciprocal decoding relative to the encoding performed by video encoder 50 described previously.

Figure 6:
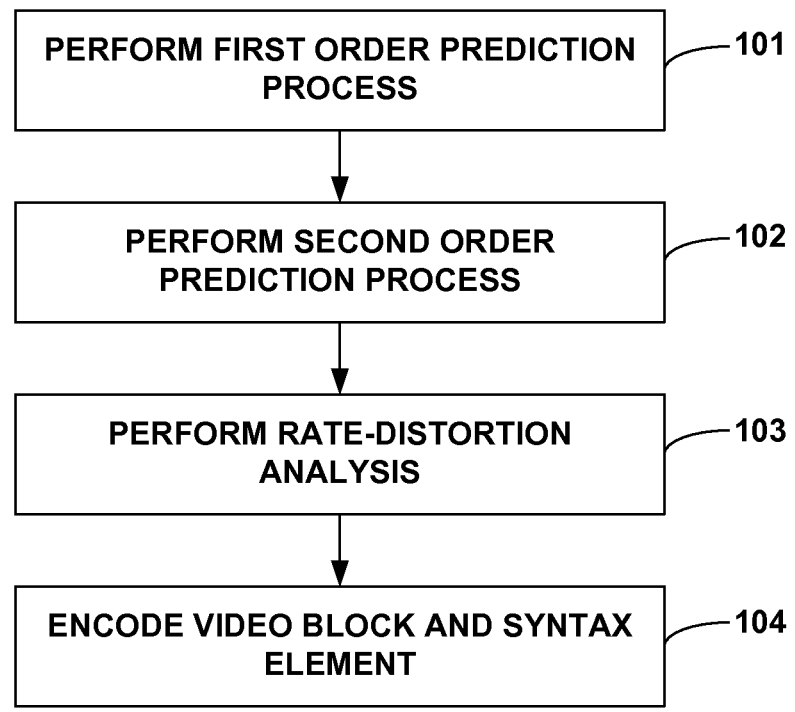
FIG. 6 is a flow chart illustrating an exemplary process performed by a video encoder consistent with this disclosure.

FIG. 6 is a flow diagram illustrating an encoding process that may be performed by video encoder 50 consistent with this disclosure. As shown, first order prediction unit 54 of prediction unit 35 performs a first order prediction process (101) to generate at least two first order residual blocks for a given video block being coded. The first order prediction process, for example, may comprise motion estimation and motion compensation consistent with ITU H.264.

Second order prediction unit 58 of prediction unit 35 performs a second order prediction process (102) to generate at least one second order residual block for the given video block being coded based on one of the first order residual blocks and a pre-defined mode for the second order prediction process. The second order prediction process may include generating second order predictive data based on neighboring residual data relative to the first order residual blocks. The pre-defined mode for the second order prediction process, as an example, may comprise a DC mode in which a set of second order predictive values are defined as an average of a set of neighboring residual values.

As described above, performing the first order prediction process may include identifying a first motion vector for the first order prediction of the given video block based on a first assumption that the second order prediction will not be used, and identifying a second motion vector for the first order prediction of the given video block based on a second assumption that the second order prediction will be used, wherein the second motion vector is different than the first motion vector. The second order prediction process may comprise a process of generating second order predictive data based on neighboring residual values relative to one of the first order residual blocks, wherein for purposes of identifying the second motion vector for the first order prediction of the given video block based on the second assumption, at least some of the neighboring residual values are estimated based on at least some original pixels values defined prior to any transformation, quantization, de-quantization or inverse transformation by the encoder.

R-D analysis unit 64 performs a rate-distortion analysis (103) with respect to the second order residual block and at least one of the first order residual blocks to substantially minimize a rate-distortion cost associated with encoding the given video block, wherein the rate distortion analysis with respect to the second order residual block accounts for a combined effect of the first order prediction process and the second order prediction process in coding the given video block. In this case, R-D analysis unit 64 may compare various first order encoding modes to the second order encoding mode that combines the first order prediction process and the second order prediction process. In this way, R-D analysis unit 64 may determine and select the best encoding mode based on a lowest RD cost value determined for the different modes. As discussed herein, the combined first order prediction process and the second order prediction process may be different than first order encoding alone to ensure that motion vectors defined in the first order encoding process part of the combined first and second order encoding process can account for the secondary effects that the second order encoding process will have on the first order residuals. Video encoder 50 then encodes the given video block and an associated syntax element (104) based on the rate-distortion analysis.

In particular, after R-D analysis unit 64 selects the best coding mode, adder 48 may generate the residual for the selected mode, which may be a first order residual or second order residual depending on the mode that is selected. For macroblocks that are candidates for second order prediction, prediction unit 35 may also encode one bit per macroblock to indicate whether second order prediction should be used by a decoder to decode one or more video blocks defined for a given macroblock. Prediction unit 35 forwards the syntax elements to entropy coding unit. The residual block (again, either the first order or second order residual) may be transformed and quantized by transform unit 38 and quantization unit 40. Entropy coding unit 46 then entropy codes the data before outputting the encoded bitstream.

Figure 7:
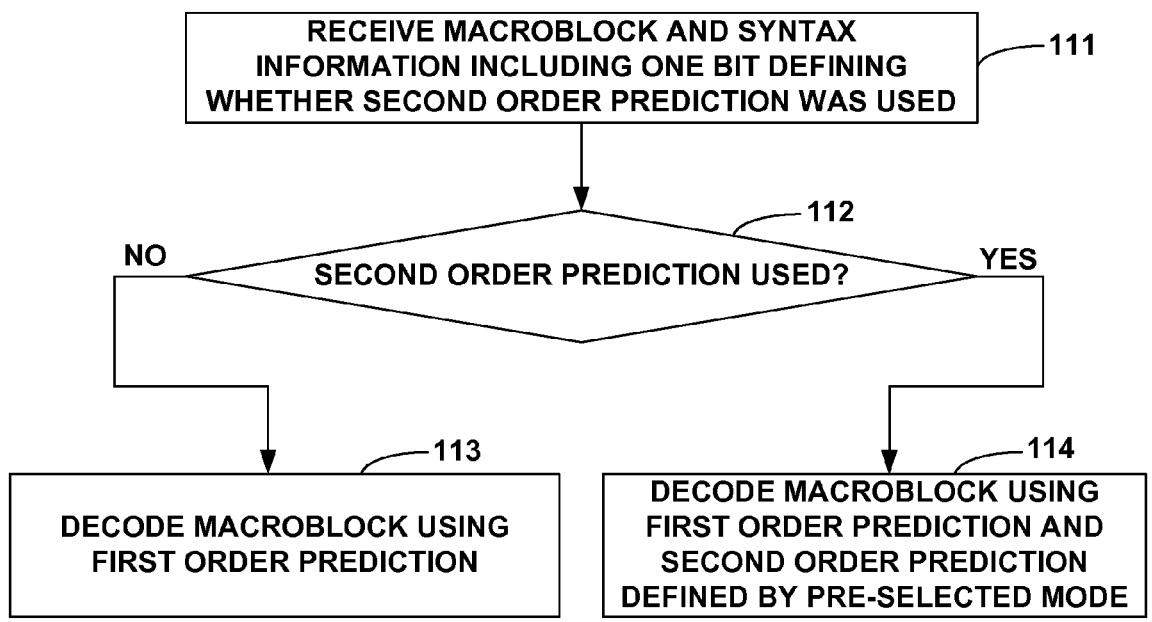
FIG. 7 is a flow chart illustrating an exemplary process performed by a video decoder consistent with this disclosure.

FIG. 7 is a flow diagram illustrating a decoding process consistent with this disclosure. Video decoder 70 receives a macroblock and associated syntax elements that include one bit defining whether second order prediction was used (111). If second order prediction was not used (no branch of 112) video decoder 70 decodes the macroblock using first order prediction (113). In this case, following entropy decoding by unit 72, prediction unit 75 performs a first order prediction process to identify a first order predictive block used to code a given video block, and adder 79 decodes the given video block based on the first order predictive block by adding a residual block (output from inverse transform unit 78) to the predictive block.

If the one bit indicates that second order prediction was used (yes branch of 112), video decoder 70 decodes the macroblock using first order prediction similar to that described above, as well as second order prediction defined by a pre-selected mode (114). In this case, following entropy decoding by unit 72, prediction unit 75 performs a first order prediction process and a second order prediction process, wherein the second order prediction defines a pre-defined prediction mode. Adder 79 decodes the given video block based on first order predictive block and a second order predictive block by adding a residual block (in this case a second order residual that is output from inverse transform unit 78) to the second order predictive block to generate a first order residual, and then adding the first order residual to the first order predictive block to form a reconstructed block that is stored in memory 74. As described in this disclosure, the second order predictive block may comprise predictive residual data defined based on neighboring residual data relative to a given video block, and the pre-defined mode of the second order prediction process may comprise a DC mode in which a set of second order predictive values are defined as an average of a set of neighboring residual values relative to given video block.

The techniques of this disclosure may be implemented in a wide variety of devices or apparatuses, including a wireless communication device handset such as a mobile phone, an integrated circuit (IC) or a set of ICs (i.e., a chip set). Any components, modules or units have been described provided to emphasize functional aspects and does not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

If implemented in software, the techniques may be realized at least in part by a computer-readable medium comprising instructions that, when executed in a processor, performs one or more of the methods described above. The computer-readable medium may comprise a computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code or instructions may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video codec. Also, the techniques could be fully implemented in one or more circuits or logic elements.

The disclosure also contemplates any of a variety of integrated circuit devices that include circuitry to implement one or more of the techniques described in this disclosure. Such circuitry may be provided in a single integrated circuit chip or in multiple, interoperable integrated circuit chips in a so-called chipset. Such integrated circuit devices may be used in a variety of applications, some of which may include use in wireless communication devices, such as mobile telephone handsets.

Various examples have been described in this disclosure. These and other examples are within the scope of the following claims.

The invention claimed is:

1. A method of decoding video data in a video decoder, the method comprising:
   receiving one bit per macroblock that defines whether second order prediction was used in an encoding process on the macroblock;
   performing a first order prediction process via the video decoder to identify a first order predictive block used to code a given video block;
   if the one bit indicates that second order prediction was not used, decoding the given video block based on the first order predictive block;
   if the one bit indicates that second order prediction was used, performing a second order prediction process via the video decoder to generate a second order predictive block used to code the given video block, wherein the second order prediction defines a pre-defined prediction mode; and
   if the one bit indicates that second order prediction was used, decoding the given video block based on the first order predictive block and the second order predictive block.

2. The method of claim 1, wherein the second order predictive block comprises predictive residual data defined based on neighboring residual data relative to given video block.

3. The method of claim 2, wherein the pre-defined mode of the second order prediction process comprises a DC mode in which a set of second order predictive values are defined as an average of a set of neighboring residual values relative to given video block.

4. A video decoding apparatus that decodes video data, the video decoding apparatus comprising:
   a decoding unit that receives and decodes one bit per macroblock that defines whether second order prediction was used in an encoding process on the macroblock; and
   a prediction unit that performs a first order prediction process to identify a first order predictive block used to code a given video block,
   wherein if the one bit indicates that second order prediction was not used, the video decoding apparatus decodes the given video block based on the first order predictive block;
   wherein if the one bit indicates that second order prediction was used, the prediction unit performs a second order prediction process to generate a second order predictive block used to code the given video block, wherein the second order prediction define a pre-defined prediction mode, and
   wherein if the one bit indicates that second order prediction was used, the video decoding apparatus decodes the given video block based on the first order predictive block and the second order predictive block.

5. The video decoding apparatus of claim 4, wherein the second order predictive block comprises predictive residual data defined based on neighboring residual data relative to given video block.

6. The video decoding apparatus of claim 5, wherein the pre-defined mode of the second order prediction process comprises a DC mode in which a set of second order predictive values are defined as an average of a set of neighboring residual values relative to given video block.

7. The video encoder apparatus of claim 4, wherein the video decoding apparatus comprises one of:
   a video decoder,
   an integrated circuit,
   a microprocessor, and
   a wireless communication device that includes a video decoder.

8. A device for decoding video data, the device comprising:
   means for receiving one bit per macroblock that defines whether second order prediction was used in an encoding process on the macroblock;
   means performing a first order prediction process to identify a first order predictive block used to code a given video block;
   if the one bit indicates that second order prediction was not used, means for decoding the given video block based on the first order predictive block;
   if the one bit indicates that second order prediction was used, means for performing a second order prediction process to generate a second order predictive block used to code the given video block, wherein the second order prediction defines a pre-defined prediction mode; and
   if the one bit indicates that second order prediction was used, means for decoding the given video block based on the first order predictive block and the second order predictive block.

9. The device of claim 8, wherein the second order predictive block comprises predictive residual data defined based on neighboring residual data relative to given video block.

10. The device of claim 9, wherein the pre-defined mode of the second order prediction process comprises a DC mode in which a set of second order predictive values are defined as an average of a set of neighboring residual values relative to given video block.

11. A computer-readable storage medium having instructions stored thereon that, upon execution by a processor, cause the processor to decode video data, wherein upon receiving one bit per macroblock that defines whether second order prediction was used in an encoding process on the macroblock, the instructions cause the processor to:
   perform a first order prediction process via the video decoder to identify a first order predictive block used to code a given video block;
   if the one bit indicates that second order prediction was not used, decode the given video block based on the first order predictive block;
   if the one bit indicates that second order prediction was used, perform a second order prediction process via the video decoder to generate a second order predictive block used to code the given video block, wherein the second order prediction define a pre-defined prediction mode; and
   if the one bit indicates that second order prediction was used, decode the given video block based on the first order predictive block and the second order predictive block.

12. The computer-readable storage medium of claim 11, wherein the second order predictive block comprises predictive residual data defined based on neighboring residual data relative to given video block.

13. The computer-readable storage medium of claim 12, wherein the pre-defined mode of the second order prediction process comprises a DC mode in which a set of second order predictive values are defined as an average of a set of neighboring residual values relative to given video block.

* * * * *